(12) United States Patent
Murray

(10) Patent No.: US 9,802,708 B2
(45) Date of Patent: Oct. 31, 2017

(54) AIRCRAFT LOW CLEARANCE FLUID CHECK VALVE

(75) Inventor: Jonathan David Murray, Greenbelt, MD (US)

(73) Assignee: Eaton Corporation, Cleveland, OH (US)

( * ) Notice: Subject to any disclaimer, the term of this patent is extended or adjusted under 35 U.S.C. 154(b) by 1182 days.

(21) Appl. No.: 13/381,488

(22) PCT Filed: Jun. 30, 2010

(86) PCT No.: PCT/US2010/040591
§ 371 (c)(1),
(2), (4) Date: Feb. 2, 2012

(87) PCT Pub. No.: WO2011/002879
PCT Pub. Date: Jan. 6, 2011

(65) Prior Publication Data
US 2012/0118419 A1    May 17, 2012

Related U.S. Application Data

(60) Provisional application No. 61/221,961, filed on Jun. 30, 2009.

(51) Int. Cl.
| | |
|---|---|
| *F16K 15/03* | (2006.01) |
| *B64D 13/02* | (2006.01) |
| *F16K 1/16* | (2006.01) |

(52) U.S. Cl.
CPC .............. *B64D 13/02* (2013.01); *F16K 1/165* (2013.01); *F16K 15/038* (2013.01);
(Continued)

(58) Field of Classification Search
CPC . B64D 13/02; F16K 15/038; Y10T 137/6906; Y10T 137/7837; Y10T 137/6017; Y10T 137/598
(Continued)

(56) References Cited

U.S. PATENT DOCUMENTS

| | | | | |
|---|---|---|---|---|
| 1,404,804 A | * | 1/1922 | Stevens | 137/515.5 |
| 3,384,112 A | * | 5/1968 | Smith | 137/512.1 |

(Continued)

OTHER PUBLICATIONS

SAE International, AS1895 Standards Publication, Dec. 1, 1985, http://standards.sae.org/as1895/.*

(Continued)

*Primary Examiner* — Kevin Murphy
(74) *Attorney, Agent, or Firm* — Fishman Stewart PLLC

(57) ABSTRACT

A fluid check valve for use in an aircraft fluid handling system having a confined surrounding structure where a first distance is defined between a fluid duct and the surrounding structure where the design of the fluid check valve is configured to facilitate removal of a first flange and the flow duct by moving the first flange and flow duct a second distance that is less than the first distance. The check valve is offset into the upstream side of a second flange to provide the reduction in the distance that the first flange has to be displaced to remove the first flange and flow duct from the check valve. A first alternate configuration of the fluid check valve utilizes rotational stops attached to the downstream surface of the flow flaps and in a second alternate embodiment configuration, rotational stops extend upstream from the flow flaps.

12 Claims, 6 Drawing Sheets

(52) U.S. Cl.
CPC ...... *Y10T 137/598* (2015.04); *Y10T 137/6017* (2015.04); *Y10T 137/6906* (2015.04); *Y10T 137/7837* (2015.04)

(58) Field of Classification Search
USPC ..... 137/315.01, 315.13, 15.01, 15.18, 15.19, 137/512.1, 527; 251/146, 284–286
See application file for complete search history.

(56) References Cited

U.S. PATENT DOCUMENTS

| | | |
|---|---|---|
| 3,996,961 A | 12/1976 | Siegwart |
| 6,253,788 B1 | 7/2001 | Palvolgyi |
| 2005/0116114 A1* | 6/2005 | Aitchison et al. ............ 244/207 |

OTHER PUBLICATIONS

International Search Report, PCT/US2010/040591, dated Feb. 18, 2011.

* cited by examiner

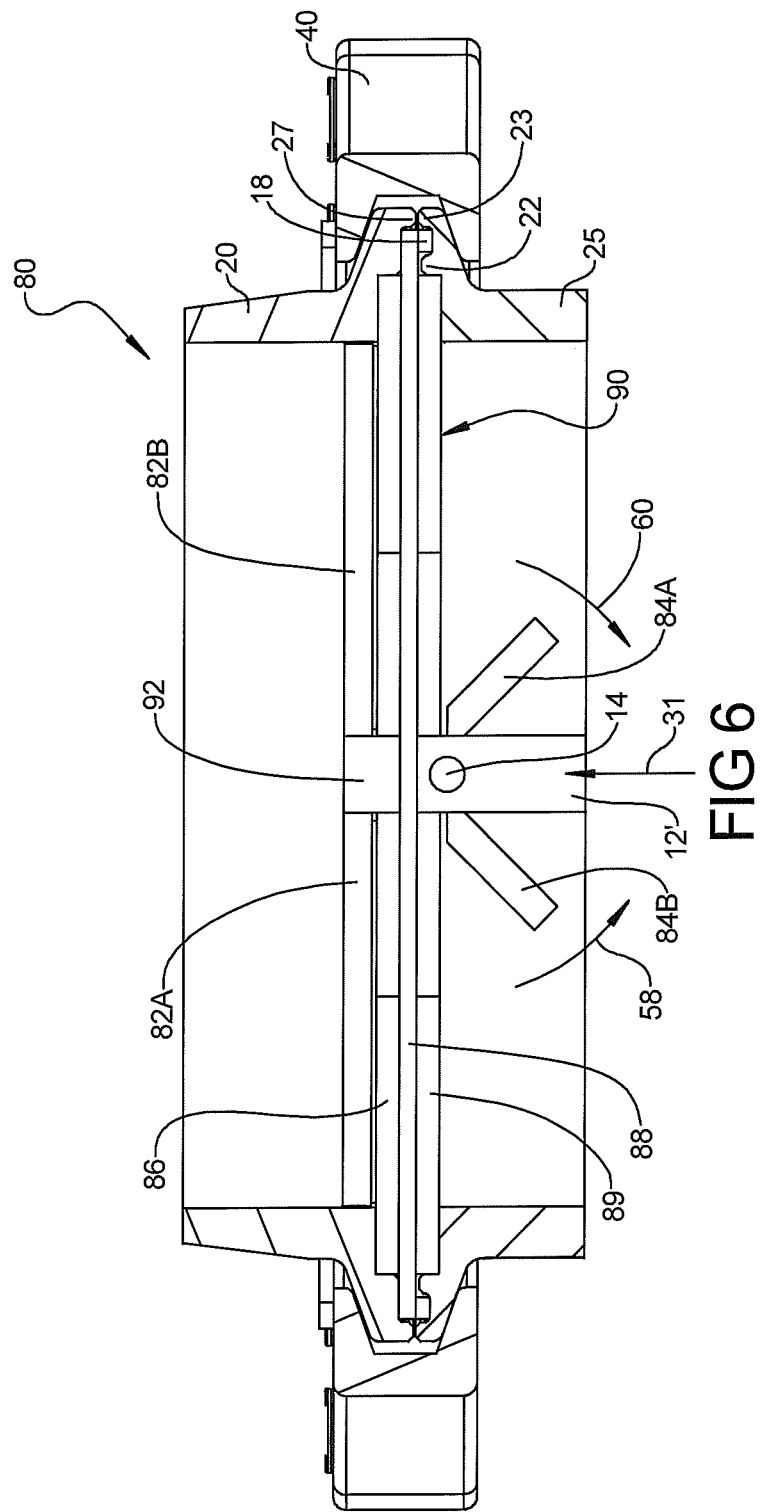

AIRCRAFT LOW CLEARANCE FLUID CHECK VALVE

CROSS-REFERENCES TO RELATED APPLICATIONS

This application is a National Stage application which claims the benefit of International Application No. PCT/US2010/040591, filed Jun. 30, 2010, which claims priority based on U.S. Application No. 61/221,961, filed Jun. 30, 2009, all of which are hereby incorporated by reference in their entireties.

TECHNICAL ORIENTATION

This low clearance fluid check valve relates to a fluid valve assembly for use in an aircraft fluid transport system having limited structural clearance where the associated ducting must be removed to service the check valve. The structure of the fluid check valve is such that at least one fluid duct can be attached or removed with a reduced amount of clearance.

BACKGROUND

It is known to place a flap type check valve in the flow stream of a fluid to prevent fluid from flowing in a direction that is opposite to that desired. This type of valve is widely used in such applications as home sump pumps and in industrial chemical plants and in aircraft ground fuel handling equipment. However, in these applications, space is not at a premium and the removal of the fluid duct work that is joined to the check valve assembly is not hindered by the location of other components or surrounding structure. In other applications, the surrounding structure can hinder the removal of the inlet and/or outlet fluid ducts. A good illustration of this type of application is aircraft fluid systems where the back flow of engine generated bleed air cannot be tolerated and where surrounding aircraft structure can be confining for the assembly and disassembly of fluid ducting. In these applications it would be desirable to incorporate a fluid check valve that exhibits a low clearance profile in at least one side of the check valve to allow for the removal of the associated fluid duct with a minimal amount of displacement of the duct away from the check valve. This required amount of displacement would allow the duct to be removed with clearance from the surrounding structure unlike prior art check valves which require that other aircraft systems and structure be disassembled to yield the required amount of displacement clearance to allow for removal of the fluid duct.

SUMMARY

The present low clearance fluid check valve is particularly well suited for use in an aircraft environment since it has a unique structure and function that facilitates the removal and servicing of the check valve through removal of a mating fluid duct. The prior art aircraft fluid check valve requires a much greater clearance to remove one of the fluid ducts to service the check valve. Disclosed is an aircraft check valve having a low clearance required to service the check valve. A number of alternate embodiments are also disclosed which reduce the distance that the mating fluid duct has to be lifted or displaced from the check valve to allow for removal of the fluid duct from the aircraft or other system. In a first embodiment, the positioning of the valve has been moved relative to the duct flange mating line in a direction opposite to the duct that is to be removed. In this version, a tower is used as a travel stop for the check valve opening and closing flaps. This provides for reduction of the displacement that the fluid duct has to be displaced (moved) to allow for it to be laterally moved and removed from the aircraft.

In a second embodiment, a plurality of rotation stops that are attached to opening and closing flaps of the check valve are located on the downstream side of the flaps. These stops are much lower in profile that the tower style of stop. This configuration provides for a lower clearance height and the fluid duct can be moved away from the check valve assembly a reduced distance prior to removing it from the check valve.

In a third embodiment, the rotation stops for limiting the rotation of the flaps have been formed by extending the flaps at an angle away from the flap towards the upstream flow. When the flaps are fully opened, the stops contact a tower that is formed on the upstream side of the check valve. This results in a very low profile on the downstream side and the downstream duct only has to be lifted away from the check valve a short distance before it can be laterally shifted and removed from the check valve assembly as part of the aircraft fluid ducting system.

BRIEF DESCRIPTION OF THE DRAWINGS

FIG. 6 is a cross-sectional view of a second alternate embodiment of the exemplary fluid check valve.

DETAILED DESCRIPTION

Figure 1:
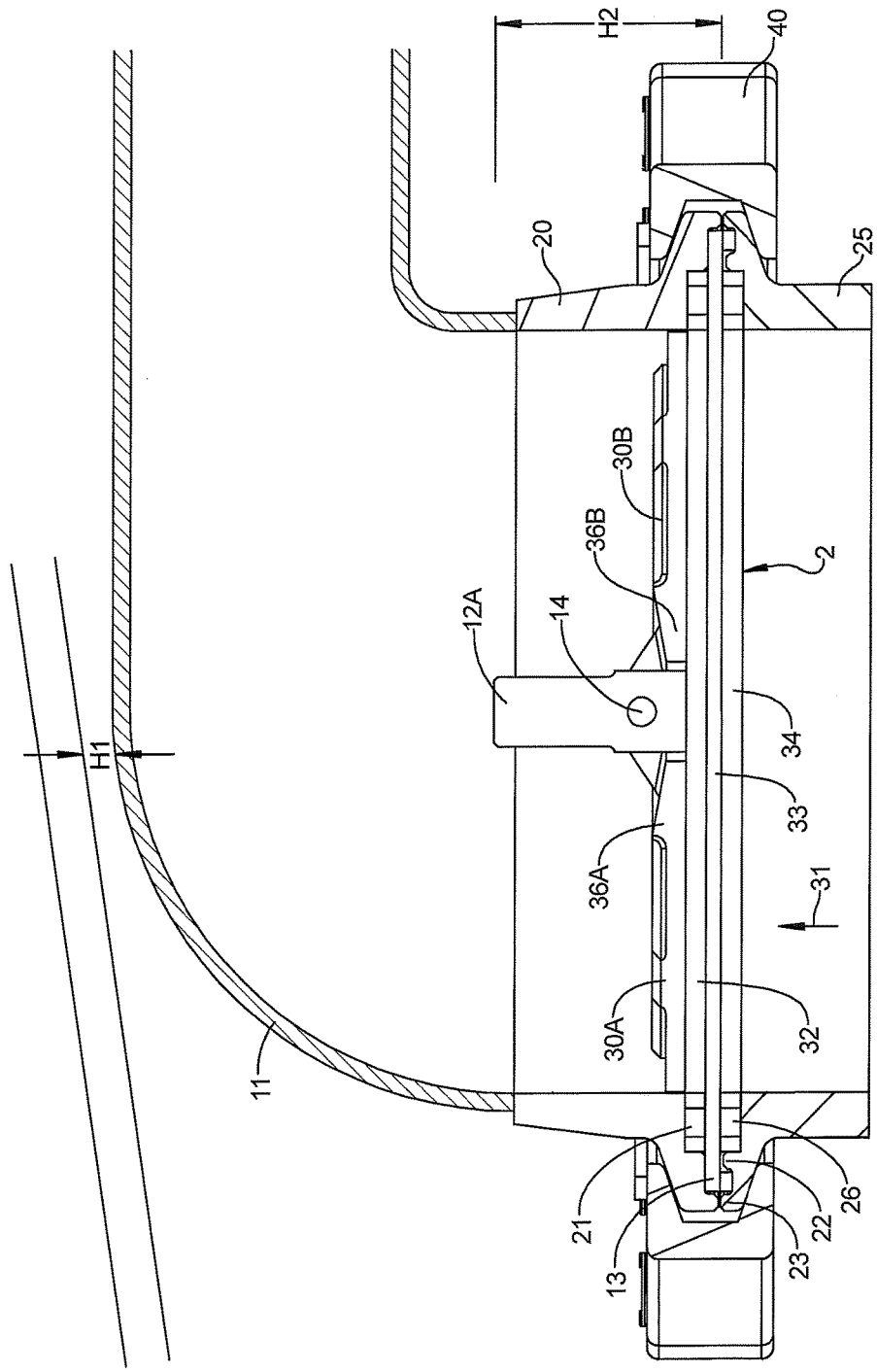
FIG. 1 is a cross-sectional view of a prior art fluid check valve assembly installed in an aircraft.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Now referring to FIG. 1 of the drawings, a cross-sectional view of a prior art fluid check valve 2 assembly is shown. The prior art check valve 2 assembly is shown installed in an aircraft having a structure wall which is distance H1 from a fluid duct 11. The fluid duct 11 is attached to a duct flange 20 which is held against a check valve flange 13, which extends from the check valve assembly 2, by a band clamp 40. To allow for removal of the check valve 2 the distance that the duct flange 20 must be displaced upward away from the duct flanges 20, 25 interface is a distance labeled as H2. Note that in this installation, the distance H2 exceeds the distance H1. Thus, the check valve 2 cannot be removed for servicing or replacement unless the structure wall is moved away from the fluid duct 11 or the fluid system containing the prior art fluid check valve 2 assembly is removed from the aircraft. Reducing the distance H2 that is required to remove the duct 11 and first duct flange 20 from the aircraft to a value less that the distance H2 would facilitate removal of the prior art check valve 2 assembly without the complication of removing the prior art fluid check valve 2 assembly from the aircraft or moving the structure wall. Such a fluid check valve assembly is shown in the subsequent Figures.

The check valve flange 13 is clamped between the first duct flange 20 and the second flange 25 and held together using band clamp 40. Seals 21 and 26 positioned on either side of the check valve flange 13 function to prevent fluid from leaking past the first duct flange 20 and second flange 25.

To locate the first duct flange 20 in position on the check valve flange is an outer annular ridge 23 which contacts the outer edge of the check valve flange 13. The second flange 25 is located relative to the check valve assembly 2 and check valve flange 13 using an inner annular ridge 22 and an outer annular ridge 23. The inner annular ridge 22 contacts a check valve flange lip 18 and the outer annular ridge 23 contacts the same check valve flange lip 18 on an opposite side thereby holding and centering the check valve 15 relative to the second duct flange 25.

Towers 12A and 12B operate to act as a stop to the opening movement of the flow flaps 30A and 30B. This is more clearly illustrated with reference to FIG. 4. Both the first flow flap 30A and the second flow flap 30B rotate on a shaft 14 and open when the flow of fluid is in flow direction 31 and then close when the flow of fluid is in an opposite direction. The check valve assembly 2 is shown in a closed position in FIG. 1.

First flap 30A and the second flow flap 30B seal at their outer surfaces against first layer 32 which supported by second and third layers 33 and 34 respectively. Note that the position of the tops of the towers 12A and 12B to a large extent determines the distance that the first duct flange 20 and fluid duct 11 must be moved upward to allow for removal of the fluid duct 11 along with the first duct flange 20 to allow for removal of the check valve assembly 2 for servicing or replacement.

Figure 2:
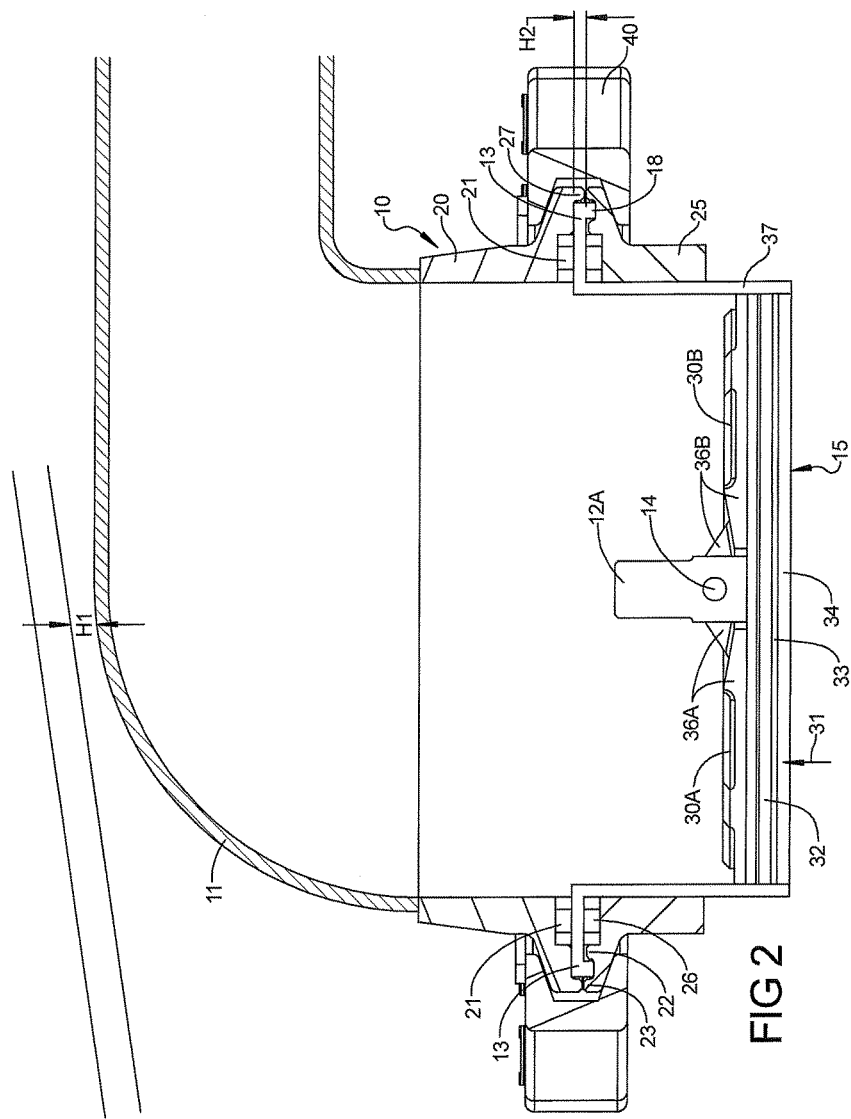
FIG. 2 is a cross-sectional view of the exemplary fluid check valve assembly installed in an aircraft.

Now referring to FIG. 2 of the drawings, a cross-sectional view of the exemplary fluid check valve assembly 10 is shown as installed in an aircraft or other similar application. A fluid duct 11 is shown as attached to the check valve 15 with a first duct flange 20. The fluid duct 11 is attached to the first duct flange 20 and extends to within a distance H1 of the structure wall 3. Attached to a second duct flange 25 is another fluid duct (not shown).

The check valve 15 includes a mounting extension flange 37 where the mounting extension flange 37 includes a check valve flange 13. The check valve flange 13 is clamped between the first duct flange 20 and the second flange 25 and held together using band clamp 40. Seals 21 and 26 positioned on either side of the check valve flange 13 function to prevent fluid from leaking past the first duct flange 20 and second flange 25.

To locate the first duct flange 20 in position on the check valve flange is a an outer annular ridge 23 which contacts the outer edge of the check valve flange 13. The second flange 25 is located relative to the check valve 15 and check valve flange 13 using an inner annular ridge 22 and an outer annular ridge 23. The inner annular ridge 22 contacts a check valve flange lip 18 and the outer annular ridge 23 contacts the same check valve flange lip 18 on an opposite side thereby holding and centering the check valve 15 relative to the second duct flange 25. The check valve 15 is spaced away from the fluid duct 11 using the mounting extension flange 37. By moving the check valve 15 downward, the vertical distance that the fluid duct 11 and first duct flange 20 must be moved upward (labeled as distance H2) is significantly reduced as compared to the prior art check valve assembly 2. Since the distance H2 is less than H1, the duct 11 and the attached first duct flange 20 can be removed allowing removal of the check valve 15 without moving the structure wall 3 or removing the whole fluid check valve assembly 10 and other fluid control system structure.

Towers 12A and 12B (not shown) operate to act as a stop to the opening movement of the flow flaps 30A and 30B. This is more clearly illustrated with reference to FIG. 4. Both the first flow flap 30A and the second flow flap 30B rotate on a shaft 14 and open when the flow of fluid is in flow direction 31 and then close when the flow of fluid is in an opposite direction. The check valve 15 is shown in a closed position in FIG. 2.

First flap 30A and the second flow flap 30B seal at their outer surfaces against first layer 32 which supported by second and third layers 33 and 34 respectively. Note that the position of the tops of the towers 12A and 12B to a large extent determines the distance that the first duct flange 20 and duct 11 must be moved upward to allow for removal of the fluid duct along with the first duct flange 20 to allow for removal of the check valve 15 for servicing or replacement.

Figure 3:
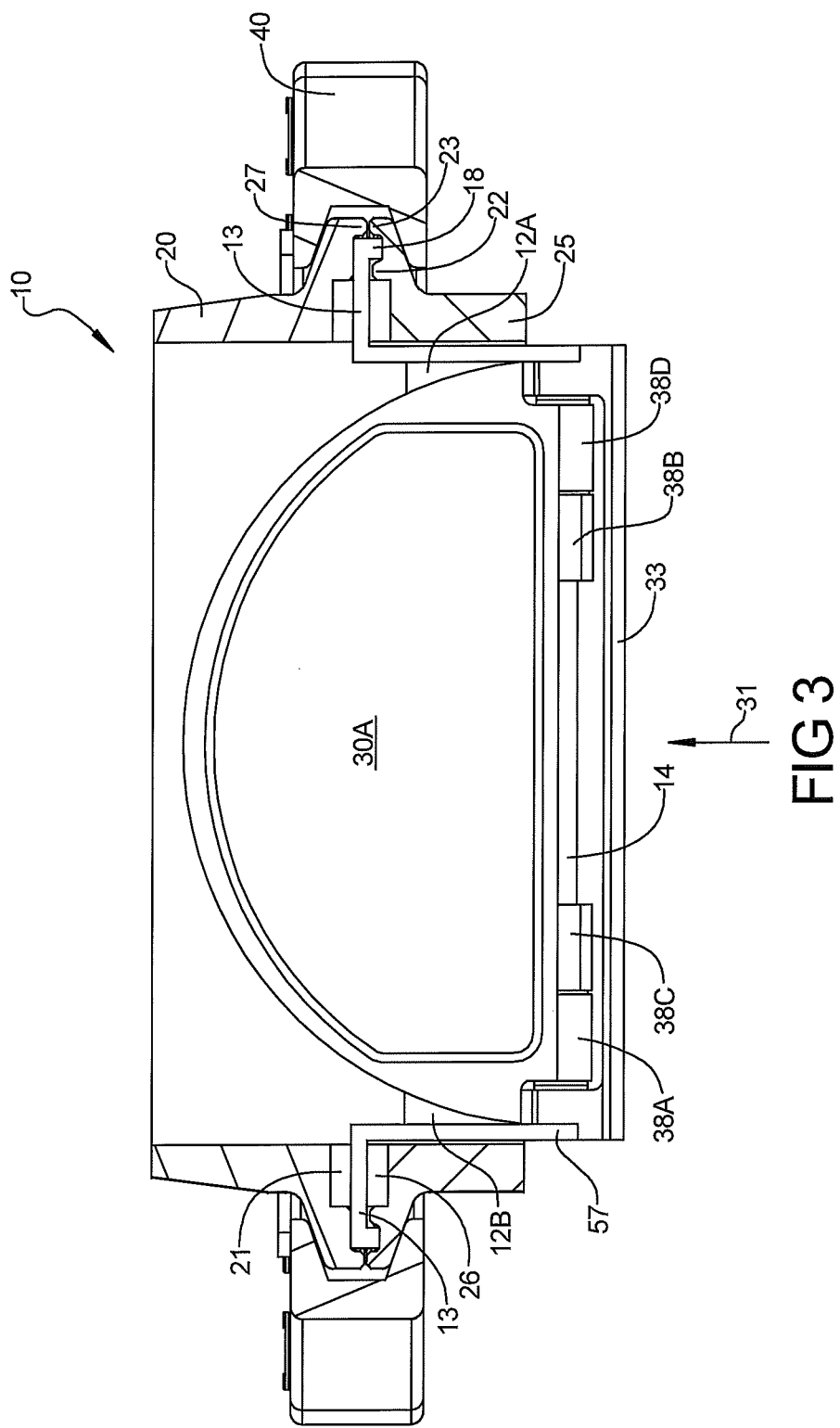
FIG. 3 is a cross-sectional view of the exemplary fluid check valve assembly with the check valve flaps in an open position.

Now referring to FIG. 3 of the drawings, a cross-sectional view of the fluid check valve assembly 10 of FIG. 2 is shown with the flow flaps 30A and 30B shown in an open position. The towers 12A and 12B act to stop the opening angle of the flow flaps 30A and 30B which rotate on bearings 38A, 38B, 38C and 38D respectively which are rotatably supported on shaft 14. Shaft 14 passes through bearings 38A, 38B, 38C, 38D and then into the mounting extension flange 57 for support. The first flow flap 30A is supported on bearings 38A and 38B while, in a similar fashion, the second flow flap 30B is rotatably supported on bearings 38C and 38D.

The first duct flange 20 is commonly attached to an air duct or to a ring flange. An AS1895 type flange can be used for either the first and/or second duct flanges 20, 25. The check valve flange 13 is trapped between the first duct flange 20 and the second flange 25 which are held together using a band clamp 40 or other suitable prior art fastening means. An inner annular ridge 22 formed in the second flange 25 locates the check valve flange 13 on the second flange 25 working in conjunction with an outer annular ridge 23 to trap the check valve flange lip 18 formed as part of the check valve flange 13. The first duct flange 20 is located on the check valve flange using the annular ridge 27 and is clamped to the second flange 25 using the band clamp 40.

Figure 4:
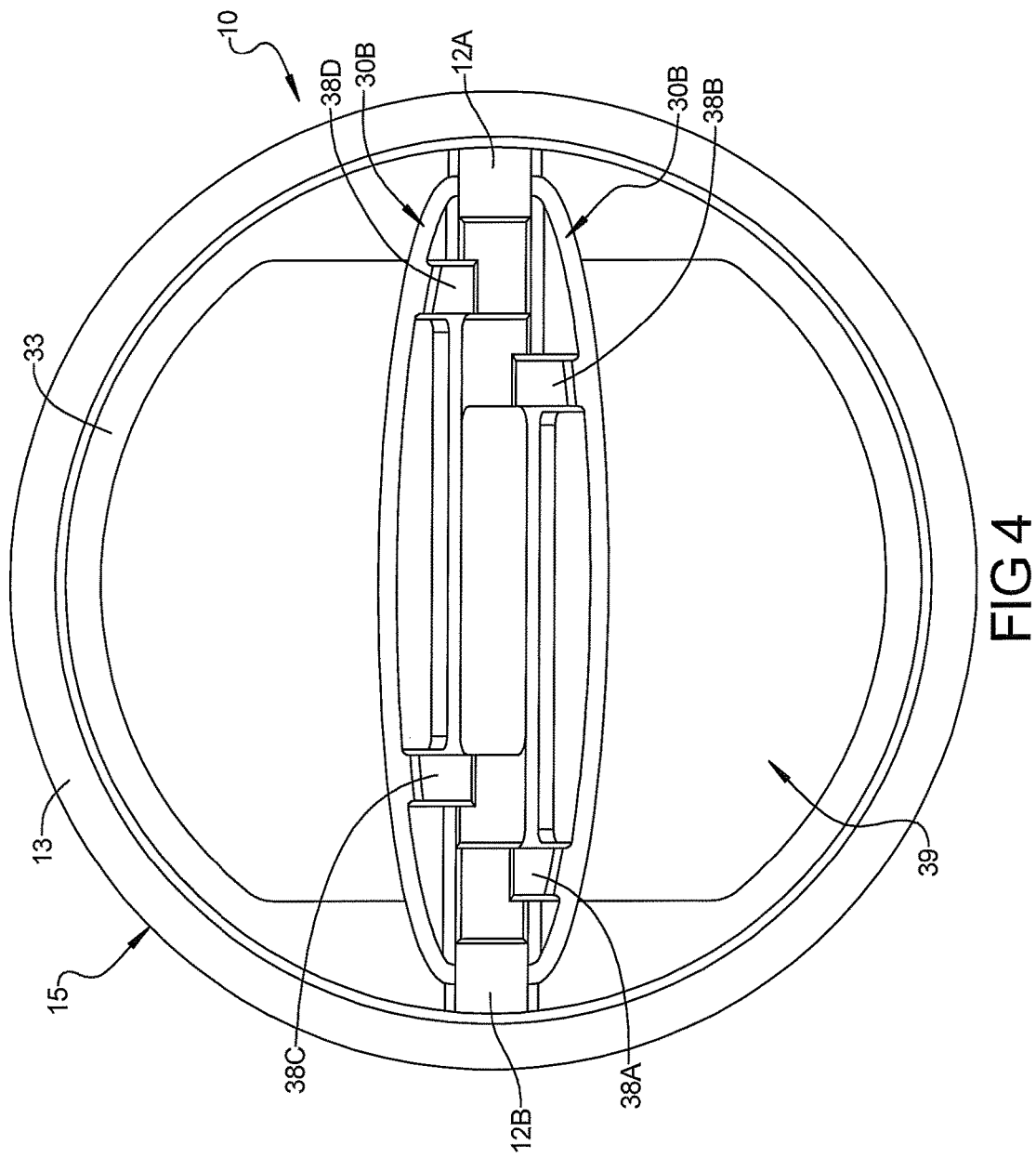
FIG. 4 is a planar top view of the exemplary fluid check valve assembly shown in FIG. 3.

Now referring to FIG. 4 of the drawings, a top planar view of the exemplary fluid check valve assembly 10 of FIG. 3 is shown in an open configuration. The check valve 15 has the check valve flange 13 extending radially to provide a platform for clamping between the first and second flanges 20 and 25. Extending out of the planar surface of the drawing are the two towers 12A and 12B and act as stops to the rotation of the first and second flow flaps 30A and 30B as shown in FIG. 4. Hinges 38A and 38B provide rotational support to the first flow flap 30A on the shaft 14, while hinges 38C and 38D provide rotational support to the second flow flap 30B on the shaft 14. When the flow flaps 30A and 30B are in the open position shown, the flow opening 39 allows fluids to flow through the fluid check valve assembly 10.

Figure 5:
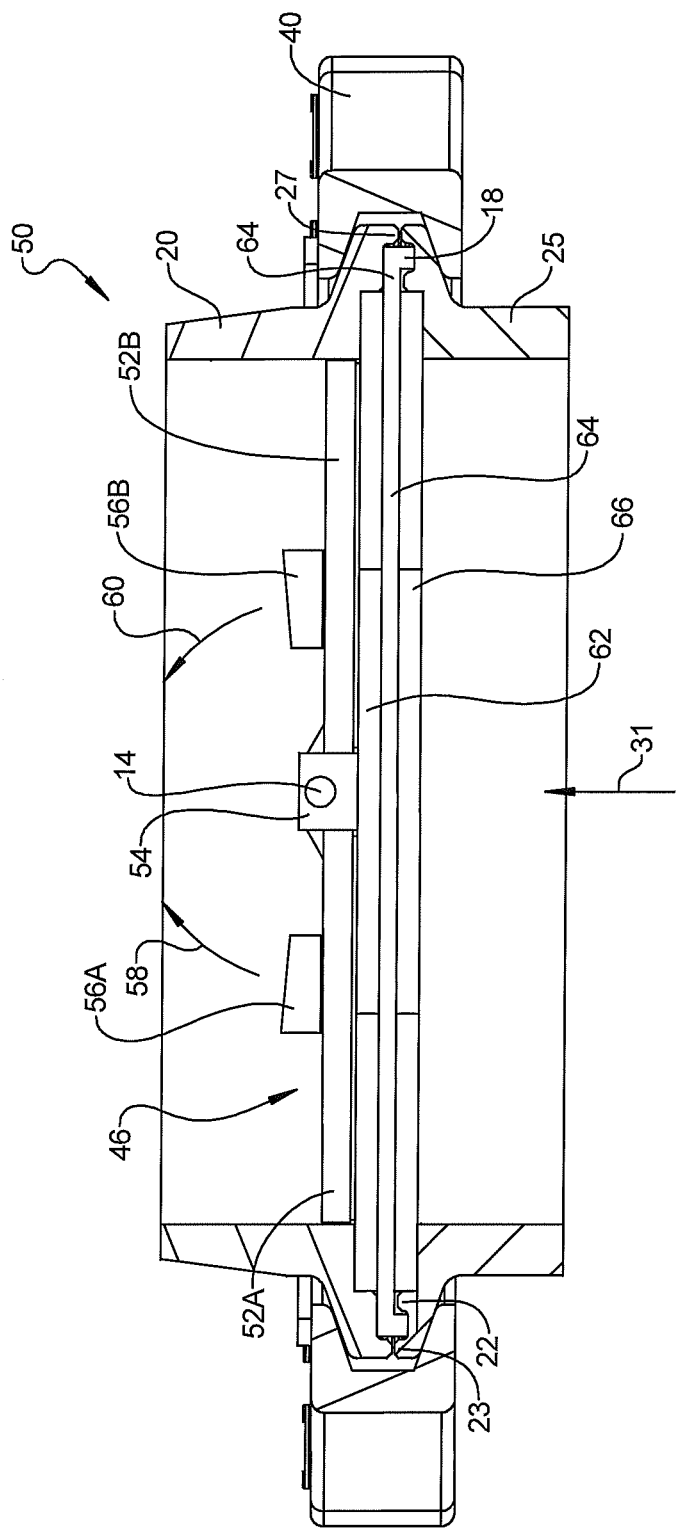
FIG. 5 is a cross-sectional view of a first alternate embodiment of the exemplary fluid check valve.

Now referring to FIG. 5, a cross-sectional view of a first alternate embodiment of the exemplary fluid check valve assembly 50 is shown in a closed position. The check valve 46 is mounted to a first duct flange 20 and a second flange 25 using a check valve flange 64 which is attached to the support block 54 and to the support layers 62 and 66. The check valve flange 64 extends to engage the first duct flange 20 and the second flange 25 and is clamped into position using a band clamp 40. An inner annular ridge 22 formed on the second flange 25 and an equally spaced outer annular ridge 23 trap the check valve flange 64 and positions the check valve 46 relative to the second flange 25. An annular ridge 27 formed on the first duct flange 20 acts to position the first duct flange 20 relative to the check valve 46.

The first and second flow flaps 52A and 52B are shown in a closed position where no flow opposite to the direction 31 is allowed. The first and second flow flaps are rotatably supported on shaft 14 where the shaft 14 is supported in support block 54 which is attached to the check valve flange 64. A first rotation stop 56A is attached to the first flow flap 52A and a second rotation stop 56B is attached to the second flow flap 52B. When the first and second flow flaps 52A, 52B are forced to an open position by the fluid flow, as shown by the motion direction arrows 58, 60, the first and second rotation stops 56A, 56B contact one another and thereby prevent the first and second flow flaps 52A, 52B from rotating any further than the pre-selected opening range.

Now referring to FIG. 6 of the drawings, a cross-sectional view of a second alternate embodiment of the exemplary fluid check valve assembly 80 is shown with the check valve 90 in a closed position such that any fluid flow in a direction opposite to the direction arrow 31 is blocked. The check valve 90 includes a check valve flange 88 which radially extends from the check valve 90 and is clamped between a first duct flange 20 and a second flange 25 using a band clamp 40 or any other suitable retaining device. The first flow flap 82A rotates about shaft 14 and is attached to a leg rotation stop 84A which extends outward at an angle from the flap hinges 38A, 38B (see FIG. 4). As the first flow flap 82A rotates to the open position, the first leg rotation stop 84A moves in the direction 60. The second flow flap 82B rotates about shaft 14 and is attached to a rotation stop 84B which extends outward at an angle form the flap hinges 38C, 38D (see FIG. 4). As the second flow flap 82B rotates to the open position, the second rotation stop 84B moves in the direction 58. At least one stop tower 12 extends downward form the check valve flange 88 and supports the shaft 14 and stops the flow flaps 82A and 82B from over rotating by contacting the first and second leg rotation stops (84A, 84B).

The check valve 90 is mounted to a first duct flange 20 and a second flange 25 using a check valve flange 88 which is attached to the support block 92 and to the supports 86 and 89. The check valve flange 88 extends to engage the first duct flange 20 and the second flange 25 and is clamped into position using a band clamp 40. An inner annular ridge 22 formed on the second flange 25 and an equally spaced outer annular ridge 23 trap the check valve flange 88 and positions the check valve 90 relative to the second flange 25. An annular ridge 27 formed on the first duct flange 20 acts to position the first duct flange 20 relative to the check valve 90.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

I claim:

1. A fluid ducting configuration comprising:
    a fluid duct installed in an aircraft structure and defining a first distance (H1) between said fluid duct and said aircraft structure;
    a check valve configured to allow removal of said fluid duct and said check valve by displacing said fluid duct a second distance (H2) relative to said check valve;
    a first duct flange connected to said fluid duct, and a check valve flange extending from said check valve, where said check valve flange is clamped at an interface between said first duct flange and a second duct flange; and
    a mounting extension flange extending transverse to the check valve flange such that the check valve is located upstream of the interface, wherein said first distance (H1) is greater than said second distance (H2).

2. The fluid ducting configuration of claim 1, further comprising a band clamp configured to clamp the first duct flange to the second duct flange such that the check valve is located upstream of the band clamp.

3. The fluid ducting configuration of claim 1, wherein said check valve includes first and second flow flaps for stopping and starting the flow of fluid within said aircraft fluid control system and includes a stop tower for limiting the rotation of said flow flaps upon opening.

4. The fluid ducting configuration of claim 1, wherein said check valve includes a travel stop mounted to each of a first flow flap and a second flow flap so as to limit the opening angle of said first and second flow flaps.

5. The fluid ducting configuration of claim 1, wherein said first duct flange or said second duct flange is attached to an AS1895 type flange.

6. The fluid ducting configuration of claim 5, wherein said check valve includes a tower stop for limiting the rotational travel of said flow flaps.

7. The fluid ducting configuration of claim 1, wherein said check valve includes first and second flow flaps.

8. The fluid ducting configuration of claim 7, wherein said check valve includes travel stops mounted to each of said first and second duct flanges.

9. The fluid ducting configuration of claim 7, wherein said check valve includes leg rotation stops extending from one or more flap hinges that are mounted to said first and second flow flaps, where said leg rotation stops limit the rotational travel of said first and second flow flaps.

10. The fluid ducting configuration of claim 9, wherein said check valve includes a tower stop, and said rotation stops contact said tower stop when said first and second flow flaps reach an open position.

11. An aircraft fluid ducting configuration comprising:
a check valve clamped between first and second duct flanges, and a band clamp configured to clamp a check valve flange at an interface between the first and second duct flanges, wherein the check valve is attached to the check valve flange and the check valve is located upstream from the interface; and
a fluid duct disposed within an aircraft structure and defining a first distance (H1) between said fluid duct and said aircraft structure, wherein the check valve is configured to allow removal of said fluid duct and said check valve by displacing said fluid duct a second distance relative to said check valve, said first distance (H1) being greater than said second distance (H2).

12. The aircraft ducting configuration of claim 11, further comprising a mounting extension flange that extends orthogonal to the check valve flange, and wherein the check valve includes at least one flap that opens upstream from the interface.

* * * * *